US010884614B1

(12) United States Patent
Austria et al.

(10) Patent No.: US 10,884,614 B1
(45) Date of Patent: Jan. 5, 2021

(54) ACTUATION INTERFACE (71) Applicant: Zoox, Inc., Foster City, CA (US)

(72) Inventors: Auver Cedric Austria, Vic (AU); Donovan Anton Bass, San Francisco, CA (US); Koun Han, San Francisco, CA (US); Timothy John Leo Koenig, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 16/206,967

(22) Filed: Nov. 30, 2018

(51) Int. Cl.
*G06F 3/0484* (2013.01)
*G06F 3/0488* (2013.01)
*B60Q 9/00* (2006.01)
*B60J 1/20* (2006.01)
*B60J 7/043* (2006.01)

(52) U.S. Cl.
CPC ........... *G06F 3/04883* (2013.01); *B60Q 9/00* (2013.01); *G06F 3/0484* (2013.01); *B60J 1/2011* (2013.01); *B60J 7/043* (2013.01); *G06F 2203/04808* (2013.01)

(58) Field of Classification Search
CPC .............................. G06F 3/0482; G06F 3/0484
USPC ......................................................... 715/771
See application file for complete search history.

(56) References Cited

U.S. PATENT DOCUMENTS

| | | | | |
|---|---|---|---|---|
| 9,601,080 B1* | 3/2017 | Faaborg | ............... | G06F 3/04883 |
| 2002/0140633 A1* | 10/2002 | Rafii | ................... | G06F 3/04815 |
| | | | | 345/8 |
| 2004/0169402 A1* | 9/2004 | Kronseder | ............... | B60J 7/047 |
| | | | | 296/216.03 |
| 2007/0210604 A1* | 9/2007 | Lin | ........................ | B60J 3/0204 |
| | | | | 296/97.2 |
| 2008/0211779 A1* | 9/2008 | Pryor | .................. | G06F 3/04847 |
| | | | | 345/173 |
| 2009/0085381 A1* | 4/2009 | Schonenback | ...... | B60R 13/0225 |
| | | | | 296/214 |
| 2009/0292989 A1* | 11/2009 | Matthews | ........... | G06F 3/04883 |
| | | | | 715/702 |
| 2012/0226977 A1* | 9/2012 | Lengeling | ........... | G06F 3/04847 |
| | | | | 715/702 |
| 2013/0249814 A1* | 9/2013 | Zeng | ..................... | G06F 3/0488 |
| | | | | 345/173 |
| 2014/0095031 A1* | 4/2014 | Boblett | ............... | G06F 3/04883 |
| | | | | 701/49 |

(Continued)

OTHER PUBLICATIONS

Mattheus Krenn "A New Car UI", archived at <https://web.archive.org/web/20140219153908/https://matthaeuskrenn.com/new-car-ui/>, archived on Feb. 19, 2014, 11 pages (Year: 2014).*

(Continued)

*Primary Examiner* — Daniel Rodriguez
(74) *Attorney, Agent, or Firm* — Lee & Hayes, P.C.

(57) ABSTRACT

An actuation interface for actuating a cover (e.g., a vehicle window, door, sun roof, partition, gate, etc.) that selectively covers an opening in a compartment may be configured for actuation based at least in part on a number of concurrent touch inputs. The cover may be controlled by receiving a touch input at the actuation interface, and detecting a number of concurrent touch inputs that are received as part of the touch input. The cover may be actuated to move based at least in part on a determination of the number of concurrent touch inputs that are received at the actuation interface.

20 Claims, 7 Drawing Sheets

(56) References Cited

U.S. PATENT DOCUMENTS

| | | | | |
|---|---|---|---|---|
| 2015/0130740 A1* | 5/2015 | Cederlund | ........... | G02B 27/017 |
| | | | | 345/173 |
| 2015/0309573 A1* | 10/2015 | Brombach | .............. | G06F 3/016 |
| | | | | 715/702 |
| 2016/0139788 A1* | 5/2016 | Nishikori | ........... | G06F 3/04847 |
| | | | | 715/716 |
| 2016/0338457 A1* | 11/2016 | Gharabegian | .......... | A45B 25/16 |
| 2017/0031530 A1* | 2/2017 | Ikeda | ................... | H04N 9/3179 |
| 2017/0228126 A1* | 8/2017 | Kim | | |
| 2017/0232825 A1* | 8/2017 | Ismailova | .................. | B60J 3/02 |
| | | | | 296/214 |
| 2017/0253121 A1* | 9/2017 | Kwon | ................. | G06F 3/03547 |
| 2017/0336901 A1* | 11/2017 | Mathew | ................. | B64D 43/00 |
| 2018/0024695 A1* | 1/2018 | Iyer | ....................... | B60K 35/00 |
| | | | | 345/175 |
| 2018/0088770 A1* | 3/2018 | Brombach | ............ | G06F 3/0482 |
| 2018/0143754 A1* | 5/2018 | Niazi | ....................... | B60R 1/00 |
| 2018/0147922 A1* | 5/2018 | Entenmann | .............. | B60J 7/022 |

OTHER PUBLICATIONS

E-CFR §571.118 Standard No. 118; Power-operated window, partition, and roof panel systems; retrieved Apr. 12, 2019 from https://www.ecfr.gov/cgi-bin/text-idx?SID=7d443eb75ceba033fed91e90f816b574&node=se49.6.571_1118&rgn=div8; 4 pages.

\* cited by examiner

ACTUATION INTERFACE

BACKGROUND

Injuries caused by closing a vehicle window, door, sun roof, or other cover on a body part (e.g., hands, fingers, feet, etc.) are not uncommon. Many of these injuries are easily avoided or remedied since, once a user that is closing the cover realizes that the opening is obstructed (by a body part or other object), the user can reopen the cover before serious harm is caused. However, if the cover is closed inadvertently (e.g., without the knowledge or intent of a user), serious harm (e.g., injury or damage) may occur before a user is able to reopen the cover. Such inadvertent closure has become more pronounced with the introduction of electrically powered doors, windows, sun roofs, and other covers. That is, because there is less effort required to actuate such powered closures, it becomes more likely that a body part or other object will be accidentally harmed by closure of a cover and/or that it will take longer for the accidental closure to be noticed and/or remedied.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

As discussed above, advent of electrically powered doors, windows, sun roofs, and other covers has increased the likelihood of inadvertent closure and, therefore, harm due to closing such a cover on a body part or other object.

This application describes an actuation interface that utilizes multiple contact points to actuate a power-operated cover in order to minimize the chances of inadvertent actuation of the power-operated cover. For instance, in some examples, the actuation interface may actuate a cover to move in response to two or more concurrent points of contact with the actuation interface, while preventing the cover from moving if fewer than two points of contact are made with the actuation interface. Thus, a power-operated cover may be selectively actuated to open and close without an anti-pinch mechanism, which can be costly and require significant space for the components to operate the anti-pinch mechanism. Further, the actuation interface may be employed in a variety of scenarios, including motor vehicles and other applications (e.g., land vehicles, air vehicles, water vehicles, buildings, etc.) and be configured as a variety of interfaces, such as a touch screen interface, a touch pad, a keyboard, a keypad, one or more tactile sensors, one or more touch sensors, or any other touch input device(s) capable of receiving touch inputs. A touch screen or touch pad actuation interface may detect touch inputs using resistive panels, surface acoustic wave panels, capacitive panels, an infrared grid, optical imaging, acoustic pulse recognition, and so forth.

In some examples, the techniques described herein may be implemented with a vehicle that includes a cover movably coupled to a body of the vehicle. The cover selectively covers an opening in a compartment of the vehicle, such as to open to provide light and fresh air into the compartment, and to close to prevent unwanted materials from entering the vehicle and to control temperature inside of the compartment. The cover may take on a variety of forms, such as a window, partition, roof panel, door, shade, and so forth. Additionally, the vehicle may take on a variety of forms, such as a motor vehicle (car, truck, sport-utility vehicle, van, bus, etc.), train, trolley, specialized vehicle (e.g., farming equipment, construction equipment, etc.), airplane, helicopter, boat, and so on.

The vehicle may also include a vehicle computing device to control operation of different aspects of the vehicle. The vehicle computing device may be configured to receive a touch input from a user at a touch interface. As discussed above, the touch interface may include a touch screen interface, a touch pad, a keyboard, a keypad, one or more tactile sensors, one or more touch sensors, or any other touch input device(s) capable of receiving touch inputs. Additionally, the vehicle computing device may detect a number of concurrent touch inputs that are received at the touch interface. In some examples, the touch interface may include a touch screen that displays one or more selectable controls, where the selectable controls may include indication to open and/or close the cover, for instance. The concurrent touch inputs may be made by one or more of hand/digit inputs, stylus inputs, other object inputs, and so forth. By using multiple concurrent touch inputs, a likelihood of accidental activation of the cover may be significantly reduced.

The vehicle computing device may further determine whether to actuate the cover to move based on a number of the concurrent touch inputs that are received at the touch interface. In some cases, the vehicle computing device may determine that the number of concurrent touch inputs is one, such as in the example of unintended contact with the touch interface. When determining the number of concurrent touch inputs, a distance between the touch inputs may be taken into account. In some examples, concurrent touch inputs may be counted if they are at least a threshold distance apart (e.g., 20 mm apart), while touch inputs that are less than a threshold distance apart may be counted as a single touch input. The distance between touch inputs may be measured between nearest edges of the touch input regions, between centroids of the touch input regions, or the like. In other words, if two contact points are within the minimum threshold distance, the vehicle computing device may treat them as though only one touch input is present in determining whether to actuate a cover to move. Thus, in some examples, the vehicle computing device may actuate a cover to move based on detecting two or more concurrent touch inputs that are spaced at least the threshold distance from one another. Alternatively or additionally, the vehicle computing device may use techniques such as clustering or determining force centroid locations to determine a number of concurrent touch inputs based on a distance between contact points with the touch interface. When a single concurrent touch input is detected, the vehicle computing device may output feedback (e.g., at the touch interface or elsewhere) comprising at least one of visual feedback, haptic feedback, or audible feedback. In a case where the touch interface is a touch screen, for instance, the vehicle computing device may output visual feedback indicating that an unselected selectable control displayed by the touch screen is to be selected by the user in order to actuate the cover to move. The feedback may indicate to the user how and/or where to provide an additional touch input if the user intends for the cover to move. Alternatively or additionally, the feedback may indicate an accidental touch input to the user, for instance so that the user may cease the unintended touch input.

The vehicle computing device may control actuation of the cover based at least in part on the determination of the number of concurrent touch inputs. In an example where the number of concurrent touch inputs is two or more, the vehicle computing device may control actuation of the cover to move from an open position to a closed position, or from the closed position to the open position. In another example, the touch input may be a multi-touch (e.g., a touch input by multiple digits generally simultaneously) swipe gesture, where a distance that the cover is actuated to move is based on a duration and/or a distance of the multi-touch swipe gesture. In yet another example, the vehicle may be a bi-directional vehicle, where the cover is configured to selectively open in a direction generally facing away from the direction of travel (e.g., with a trailing edge of the cover raised). In this example, actuating the cover to move to the open position may include selecting one of multiple open positions based on a direction of travel of the bi-directional vehicle upon detecting two or more concurrent touch inputs.

On the other hand, if the vehicle computing device determines that the number of concurrent touch inputs is one (a single concurrent touch input), the vehicle computing device may control actuating of the cover by maintaining the cover in its current position. By requiring two concurrent touch inputs to actuate the cover, the vehicle can minimize unintended or accidental activation of a powered window, roof panel, partition, or other cover without the cost and space required to include an anti-pinch system in the vehicle. However, in some examples, the vehicle may additionally include an anti-pinch system to still further reduce a likelihood of harm caused by unintended or accidental activation of a powered cover system.

These and other aspects are described further below with reference to the accompanying drawings. The drawings are merely example implementations and should not be construed to limit the scope of the claims. For example, while some example vehicles are shown and described as being autonomous vehicles that are capable of navigating between locations without human control or intervention, techniques described herein are also applicable to non-autonomous and/or semi-autonomous vehicles. Also, while the vehicle is illustrated as having a coach style body compartment, other body configurations are contemplated. Body compartments configured to accommodate any number of one or more passengers (e.g., 1, 2, 3, 4, 5, 6, 7, 8, 9, 10, 20, 100, etc.) are contemplated. Additionally, while the example body compartments shown include a passenger compartment, in other examples the body compartment may comprise a compartment for purposes other than passengers (e.g., in the case of a cargo vehicle, delivery vehicle, construction vehicle, etc.). Also, while example bi-directional vehicles are shown and described, the techniques described herein are also applicable to traditional unidirectional vehicles and other multi-directional vehicles, as well as buildings, boxes, coverings, and compartments. In the case of other multi-directional vehicles, the actuation interface system may be configured to cause a cover to open in any number of different opening directions and/or positions depending on the direction of travel of the vehicle. For instance, in the case of a quad-directional vehicle, an actuation interface system may control a rectangular cover configured to open in four different open positions (e.g., each of four edges of the cover may be independently raised to enable whichever edge of the cover is the trailing edge of the cover to be raised or otherwise opened, regardless of the direction of travel of the vehicle).

Also, while the techniques are described with respect to actuating a cover to move. In other examples, the techniques described herein may be used to actuate another system. For instance, the techniques described herein may be used to control movement of a component or object of a heating, ventilation, and air conditioning (HVAC) system, to control movement of a seat, to control movement of a vehicle in an environment, or the like.

Example Actuation Interface System Architecture

Figure 1A:
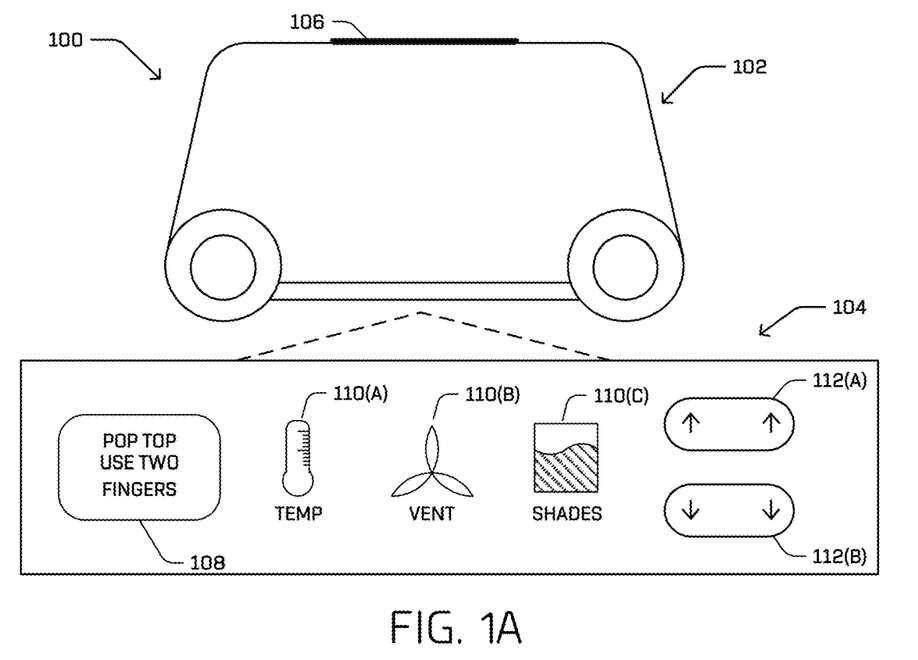
FIG. 1A is a schematic view of an example vehicle and an example actuation interface to open or close one or more covers of the vehicle, in accordance with embodiments of the disclosure.

FIG. 1A is a schematic view 100 of an example vehicle 102 and an actuation interface 104, in accordance with embodiments of the disclosure. The vehicle 102 includes a roof cover 106, which may be controlled by the actuation interface 104. The roof cover 106 in this example is shown in a closed orientation in FIGS. 1A and 1C, and an open orientation in FIGS. 1B and 1D. While the actuation interface 104 is described in relation to a vehicle 102 with reference to FIGS. 1A-FIG. 1D, the actuation interface 104 may be implemented in a variety of scenarios, such as various types of motor vehicles (car, truck, sport-utility vehicle, van, bus, etc.), trains, trolleys, specialized vehicles (e.g., farming equipment, construction equipment, etc.), airplanes, helicopters, boats, and so on. Additionally or alternatively, the actuation interface 104 may be used to control components of the vehicle 102 other than the roof cover 106, such as windows, doors, partitions, shades, interior compartments (e.g., a glove compartment, center console, etc.), and so forth. Although not pictured, the actuation interface 104 may be used to control any type of cover in an opening of a building or other compartment, such as windows, sunroofs, doors, gates, and shades, to name a few examples.

The actuation interface 104 may be displayed on a display inside and/or outside of the vehicle 102. For example, the actuation interface 104 may be displayed as part of a user interface on a display screen located on a lateral side panel of the interior of the vehicle (e.g., body panel or door), in an arm rest of the interior of the vehicle, on a center console of the interior of the vehicle, and so forth. In examples in which a vehicle has multiple rows of seats facing in a same direction, the actuation interface 104 may be displayed as part of a user interface on a display screen located on a back of a seat in a preceding row of seats. Alternatively or additionally, the actuation interface 104 may be displayed as part of a user interface on a display screen located on a lateral side, front, and/or back panel of the exterior of the vehicle, and/or on a top and/or bottom panel of the exterior of the vehicle. Furthermore, the actuation interface 104 may be displayed as part of a user interface on a display screen of a client device, such as a mobile phone or tablet device, to name a few examples. Although described as being displayed as part of a user interface in relation to FIG. 1, the actuation interface 104 may in some cases take the form of a touch pad, one or more push buttons or levers, and so forth as discussed in more detail in reference to FIGS. 3A-3E.

The actuation interface 104 may include a descriptor 108 that describes a component that can be controlled by the actuation interface and/or provides an indication that the actuation interface is capable of being controlled. The descriptor 108 in this example provides "Pop Top—Use Two Fingers," where the "Pop Top" may correspond to the roof cover 106. The actuation interface 104 may also display options 110(A), 110(B), and 110(C), which may be selectable to control additional functionality of the vehicle, which in this example correspond to temperature, venting, and shades, respectively, though any other controls are contemplated. Further, the actuation interface 104 may include selectable controls 112(A) and 112(B), which allow the user to control movement of the roof cover 106 as described above and below. For example, each of the selectable controls 112(A) and 112(B) may include selection indicators, in this case arrows, which indicate a number of contact points that are required to cause actuation of the roof cover 106 (e.g., two, three, four, five, etc.), and/or a direction of actuation of the cover 106 (e.g., up, down, left, right, etc.).

Figure 1B:
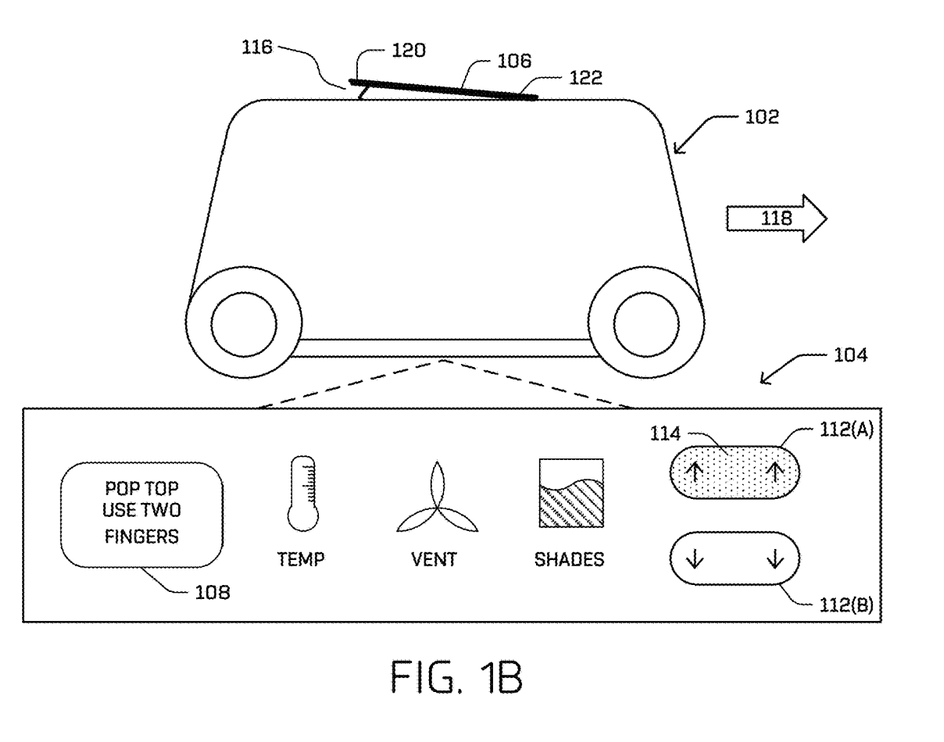
FIG. 1B is a schematic view of an example vehicle and an example actuation interface including selection of a control to open or close one or more covers of the vehicle, in accordance with embodiments of the disclosure.

For instance, as shown in FIG. 1B, a user may provide input to the actuation interface indicating selection 114 the selectable control 112(A) to cause the cover 106 to move in an upward direction in order to provide an opening in the roof of the vehicle 102. The selection 114 of the selectable control 112(A) may be a touch input on the selectable control 112(A), such as by a digit or stylus contacting a touch screen displaying the actuation interface 104. The user selection 114 may cause the descriptor 108 to output a description of the effect of the user selection, such as "Pop Top Up." The actuation interface 104 may determine a number of concurrent inputs at the selectable control 112(A), such as a number of digits generally concurrently contacting the selectable control 112(A). In response to determining that a required number of digits are in contact with the selectable control 112(A), the roof cover 106 may be actuated to open. In this example, the vehicle 102 is a bi-directional vehicle, and the cover 106 is actuated to provide an opening 116 facing away from a direction of travel 118 of the vehicle, such that a first end 120 (e.g., proximate a trailing end of the vehicle 102) of the cover 106 is raised relative to a second end 122 (e.g., proximate a leading end of the vehicle 102) of the cover.

Figure 1C:
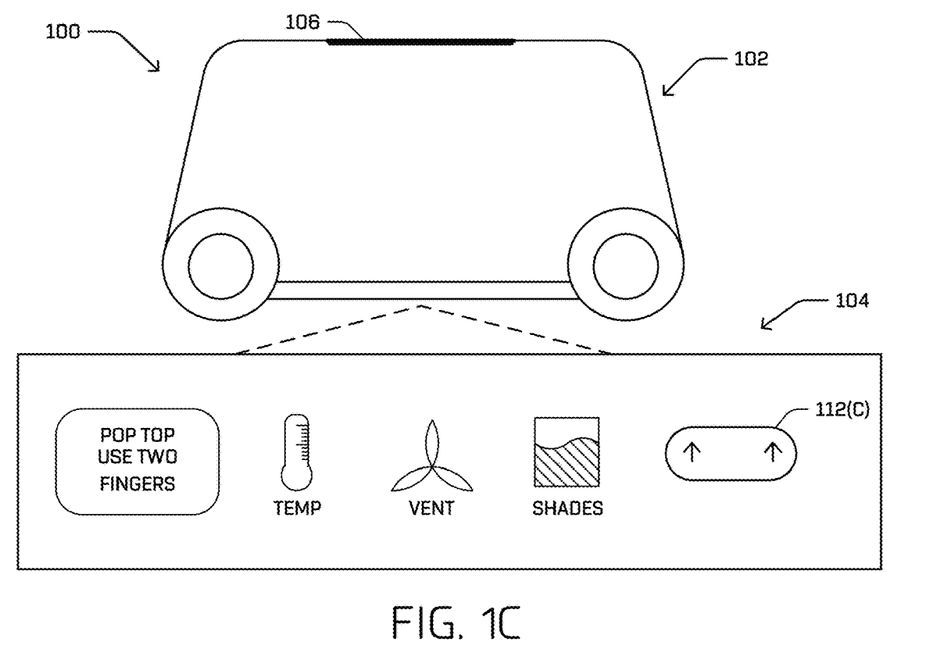
FIG. 1C is a schematic view of an example vehicle and an example actuation interface including an example selectable control dependent upon a cover being in a closed position.

In another example, FIG. 1C depicts the vehicle 102 and the actuation interface 104 including a single selectable control 112(C). In this example, the orientation of the arrow indicators displayed as part of the selectable control 112(C) are dependent on the position of the cover 106. Because the cover 106 is in the closed position, the direction of the arrows of the selectable control 112(C) indicate the possible direction of actuation of the cover to an open position from the current closed position. The correspondence between the direction of the arrows of the selectable control 112(C) and the open position are relative, and the arrows may point in any appropriate direction corresponding to available directions of actuation of the cover from a closed position to an open position. For instance, the actuation interface 104 may display arrows pointing down as part of the selectable control 112(C) when the actuation interface is used to control a traditional vehicle window located on a lateral side of the vehicle to move from a closed position to an open position.

Figure 1D:
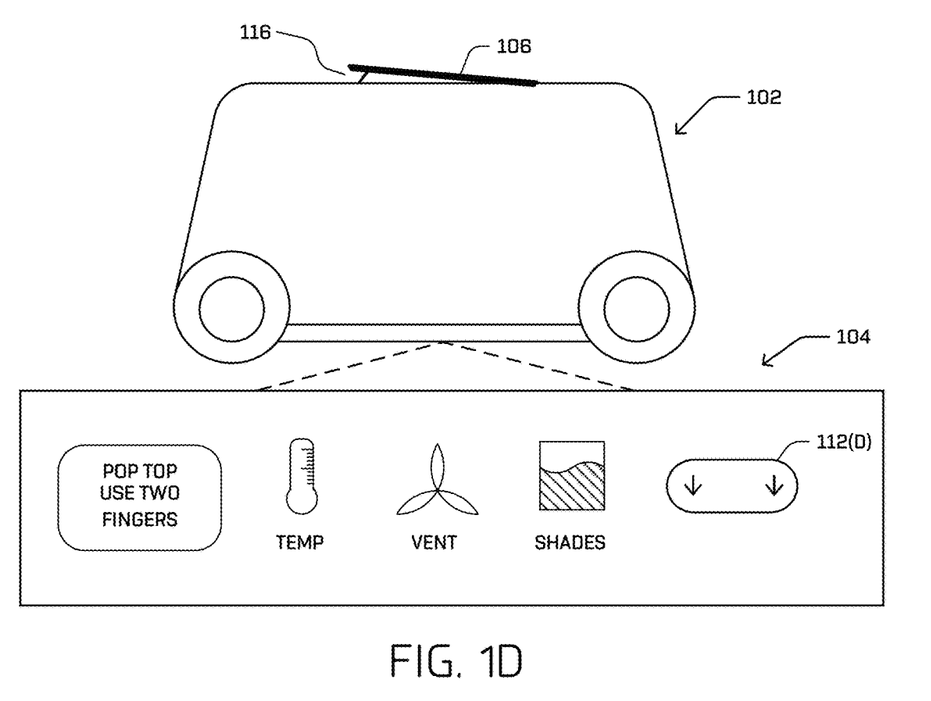
FIG. 1D is a schematic view of an example vehicle and an example actuation interface including an example selectable control dependent upon a cover being in an open position.

In yet another example, FIG. 1D depicts the vehicle 102 and the actuation interface 104 including a single selectable control 112(D). In this example, the arrow indicators displayed as part of the selectable control 112(D) are dependent upon the cover 106 being in an open position. The cover 106 may be in a fully open position in this example, causing the direction of the arrows of the selectable control 112(D) to indicate the possible direction of actuation of the cover to a closed position from the current open position, or a position in which the cover is open but the opening 116 created by the cover is smaller than the current fully open position. Similar to the discussion above, the correspondence between the direction of the arrows of the selectable control 112(D) and the closed position are relative, and the arrows may point in any appropriate direction corresponding to available directions of actuation of the cover from an open position to a closed position.

While selectable controls 112(A)-(D) in this example are shown as elongated bars or ovals, each with two selection indicators (arrows in this example), in other examples each selectable control 112(A)-(D) may include two or more separate shapes (e.g., circles, squares, dots, ovals, rectangles, or other shapes) each with a single arrow or other selection indicators. Additional examples are described below with reference to FIGS. 3A-3E.

Figure 2A:
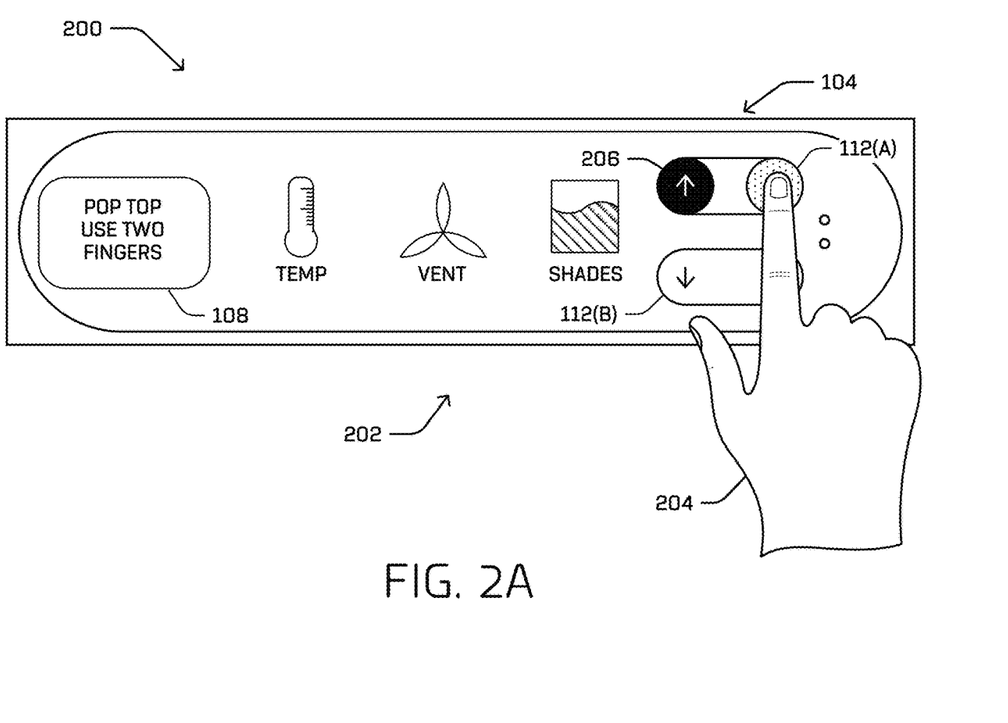
FIG. 2A depicts features of an example actuation interface including a single digit in contact with the actuation interface in accordance with embodiments of the disclosure.
Figure 2B:
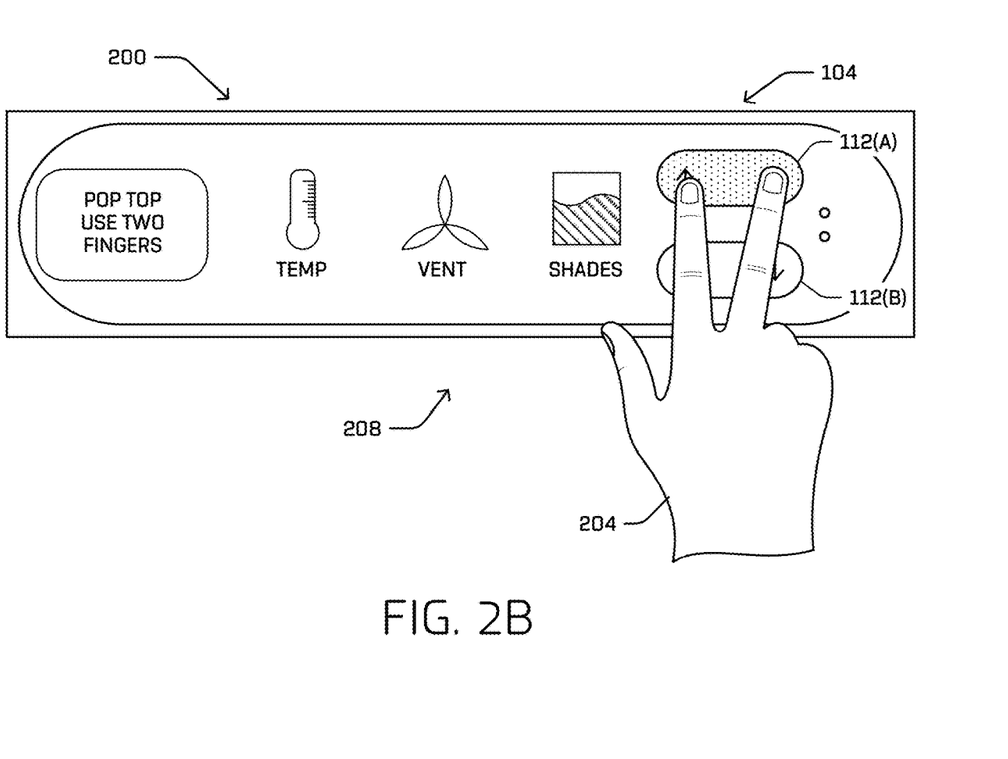
FIG. 2B depicts features of an example actuation interface including multiple digits in contact with the actuation interface in accordance with embodiments of the disclosure.

FIG. 2A depicts various features of an example system 200 including the actuation interface 104 of FIG. 1 and showing a single digit in contact with the actuation interface in accordance with embodiments of the disclosure. Further, FIG. 2B depicts various features of the example system 200 including the actuation interface 104 of FIG. 1 and showing multiple digits in contact with the actuation interface. Similar to FIG. 1, in some examples, the descriptor 108 provides "Pop Top—Use Two Fingers," where "Two Fingers" indicates a number of contact points (e.g., two) required to actuate the cover, although any suitable number of two or more contact points may be used. In a first example 202, a digit of a user's hand 204 is shown selecting one of the two selection indicators of the selectable control 112(A). While a descriptor 108 is shown in some examples, in some examples, the descriptor may be omitted.

In response to detecting a single contact point with the actuation interface 104 by the digit of the user's hand 204, the actuation interface 104 may cause the cover 106 to be maintained in a same position as described above. Additionally, the actuation interface 104 may provide feedback to the user that another contact point is needed in order to actuate the cover. In the example system 200 pictured, the actuation interface 104 may provide visual feedback by causing a selection indicator 206 of the selectable control 112(A) to blink. The visual feedback in this example may cause the selection indicator 206 of the selectable control 112(A) to blink until the selection indicator 206 is contacted, or the digit of the user's hand 204 is removed from the actuation interface 104. The visual feedback may indicate to the user where to provide the additional contact point to cause the cover 106 to move as desired. Other types of visual feedback are also contemplated to alert the user that another contact point is needed in order to actuate the cover 106, such as highlighting (e.g., circling, changing color, dimming the surrounding portions of the actuation interface 104, arrows pointing to the second contact point, an animation or video showing proper actuation by two points of contact, etc.) the selectable control 112(A) and/or the selection indicator 206, providing a modal or non-modal notification in the actuation interface 104, causing lights to blink within the vehicle, and so forth.

Alternatively or additionally, other types of feedback may be provided to alert the user that another contact point is needed in order to actuate the cover 106. Examples of other types of feedback may include haptic feedback, such as by providing a vibration at the actuation interface 104 (which, in some examples, may correspond to selection indicator 206—the unpressed selection indicator), vibration within the user's seat within the vehicle, vibration of a client device displaying the actuation interface, and so on. Furthermore, auditory feedback may be used, such as by playing sounds (e.g., one or more tones, verbal prompts, instructions, etc.) on speakers of the vehicle or on a client device being used by the user, to name a few examples. Any form of visual, haptic, and/or auditory feedback may be used alone or in combination to alert the user that another contact point is needed in order to actuate the cover.

In a second example 208, two digits of the user's hand 204 are shown selecting both of the two selection indicators of the selectable control 112(A). In response to detecting two contact points with the actuation interface 104, the actuation interface 104 may cause the cover 106 to be raised in accordance with the direction of the selectable control 112(A) (e.g., up arrows). Conversely, selection of the selectable control 112(B) in the actuation interface 104 with the required number of contact points may cause the cover 106 to be lowered in accordance with the direction of the selectable control 112(B) (e.g., down arrows). The selectable controls 112(A) and 112(B) may include selection indicators (e.g., arrows, animations, etc.) such as selection indicator 206 for actuation in a substantially same direction. For example, the selectable controls 112(A) and 112(B) may include up arrows to raise a cover, window, door, partition, tailgate, etc.; side arrows to open and/or close a cover, window, door, etc. corresponding to a direction of the arrows; down arrows to lower a cover, window, door, partition, tailgate, etc., and so on.

Furthermore, a distance that a cover is actuated to move may depend upon a duration and/or distance of the touch input. For example, a cover controlled by the actuation interface 104 may begin raising upon detection of the two digits of the user's hand 204 in the second example 208. The cover may continue to raise until the two digits of the user's hand 204 are no longer detected to be in contact with the selectable control 112(A) or until the cover reaches an extent of its range of motion (e.g., fully open or fully closed), whichever occurs first. In another example, a cover controlled by the actuation interface 104 may be activated upon detection of the two digits of the user's hand 204 in the second example 208, but will not begin moving until the two digits of the user's hand 204 swipe along the actuation interface 204. Continuing with this example, the cover may move a corresponding distance to a swipe gesture by the two digits of the user's hand 204, such that the user may control how much the cover moves based on the distance of the swipe. The cover as described in these examples may be any of the specific examples described, such as window, partition, door, and so forth, and may further be applied to systems other that covers (e.g., shades, HVAC, etc.).

Alternatively or additionally, the selectable controls 112(A) and 112(B) in the actuation interface 104 may be "binary" controls. Binary control of a cover, for instance, may cause the cover to open fully or close fully in response to detection of a required number of concurrent inputs in the actuation interface 104. For example, a cover controlled by the actuation interface 104 may fully open upon detection of the two digits of the user's hand 204 in the second example 208, without a correspondence to a duration of the contact with the selectable control 112(A) and/or a distance of the gesture performed by the two digits of the user's hand. In another example, binary control of a cover by the actuation interface 104 may require a minimum duration of input (e.g., 1 second) to the selectable control 112(A) to cause the cover to fully open or close.

Figure 3A:
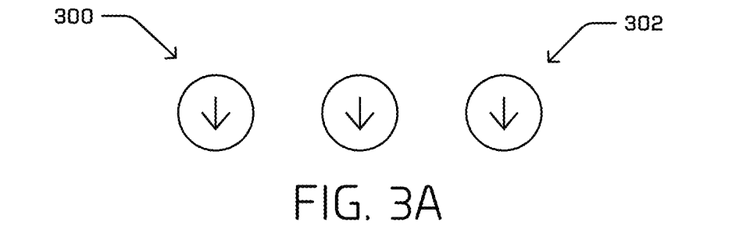
FIG. 3A depicts another example actuation interface, in accordance with embodiments of the disclosure.

FIG. 3A depicts a system 300 including another example actuation interface 104 of FIG. 1, in accordance with embodiments of the disclosure. The systems 300 may be used to actuate covers, such as a sunroof, window, door, tailgate, partition, etc. as described above and below. A selectable control 302 is shown having three separate circles, each with an arrow representing a direction of actuation of a cover associated with the selectable control. The three circles in this example are horizontally aligned and spaced equidistantly from one another, though such a configuration is depicted for illustrative purposes and is not intended to be so limiting. In other examples, the circles or other icons or components of the selectable control may be arranged in staggered alignment, triangular arrangement, or any other spacing and alignment. The selectable control 302 may be activated when all three circles are contacted by a user to control actuation of the cover, such as by three digits and/or styli. In other words, detection of contact with fewer than three of the circles in the selectable control 302 may result in the cover being maintained in a same position.

The selectable control 302 may be displayed in a touch interface, and may be configured to enable a swipe gesture with the three contacted circles, to activate motion of the cover. Alternatively or additionally, the selectable control 304 may be contacted for a duration that corresponds to a distance of movement of the cover, and/or as a "binary" open/close function as described above. While three circles are pictured in the selectable control 302, any suitable number of circles may be displayed (e.g., 2, 4, 5, etc.), and indicate a corresponding number of contact points that are required to actuate the cover to move. Additionally, a direction of the arrows shown in the selectable control 302 may be up, down, left, right, and/or diagonally oriented, such as to represent a direction of movement of the cover. In some cases, the arrows may be omitted from the selectable control 302 when the selectable control 302 is displayed in the actuation interface 104.

Figure 3B:
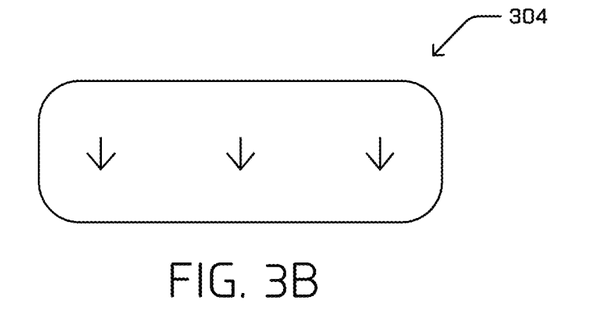
FIG. 3B depicts another example actuation interface in accordance with embodiments of the disclosure.

FIG. 3B depicts another example actuation interface including a selectable control 304 having a single bar with three arrows representing a direction of actuation of a cover associated with the selectable control. Rather than requiring that the contact points be in specific locations relative to one another as with the selectable control 302, the selectable control 304 may allow for three contact points located anywhere within the rectangular shape of the selectable control 304 to actuate the cover. However, similar to the selectable control 302, detection of fewer than three contact points in the selectable control 304 may result in the cover being maintained in a same position.

The selectable control 304 may also be displayed in a touch interface, and may be configured to enable a swipe gesture with the three contact points within the rectangular shape, to activate motion of the cover. Alternatively or additionally, the selectable control 304 may be contacted for a duration that corresponds to a distance of movement of the cover, and/or as a "binary" open/close function as described above. The three arrows shown in the selectable control 304 may correspond to a required number of contact points to actuate the cover to move, although any suitable number of contact points may be displayed (e.g., 2, 4, 5, etc.), and indicate a corresponding number of contact points that are required to actuate the cover to move. Additionally, a direction of the arrows shown in the selectable control 304 may be up, down, left, right, and/or diagonally oriented, such as to represent a direction of movement of the cover. In some cases, the arrows may be omitted from the selectable control 304 when the selectable control 304 is displayed in the actuation interface 104.

Figure 3C:
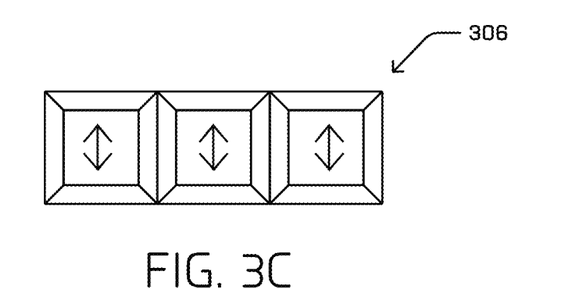
FIG. 3C depicts another example actuation interface in accordance with embodiments of the disclosure.

FIG. 3C depicts another actuation interface including a selectable control 306 having three buttons each having arrows corresponding to directions of actuations of a cover associated with the selectable control. The selectable control 306 may comprises a portion of a graphical user interface presented on a display screen or a physical user interface such as touch pad, track pad, keypad, keyboard, push buttons, touch sensors (e.g., electrostatic or capacitive touch sensors), etc. The selectable control 306 may be activated by all three of the buttons being pressed/touched to actuate the cover. If detection of fewer than three of the buttons of the selectable control 306 are pressed, the cover may be maintained in a same position. The buttons of the selectable control 306 may be pressed for a duration that corresponds to a distance of movement of the cover, and/or is a "binary" open/close function as described above.

Although three buttons are shown included in the selectable control 306, any suitable number of buttons may be included in the selectable control (e.g., 2, 4, 5, etc.), and indicate a corresponding number of contact points (e.g., pressed buttons) that are required to actuate the cover to move. Further, because the number of buttons generally remains constant on a device, the selectable control 306 may allow for different numbers of contact points (e.g., pressed buttons) than the total number of buttons. For example, opening a window may only require pressing of two of the buttons of the selectable control 306, while closing the window may require pressing of three of the buttons of the selectable control 306. A direction of the arrows shown in the selectable control 306 may be up, down, left, right, and/or diagonally oriented, such as to represent a direction of movement of the cover. In some cases, the arrows may be omitted from the selectable control 306. The selectable control 306 may not be displayed as part of a user interface, but may operate in conjunction with a user interface to communicate information to a user regarding the cover, such as to provide visual feedback to the user when the user has pressed fewer than the required number of buttons to actuate the cover to move.

Figure 3D:
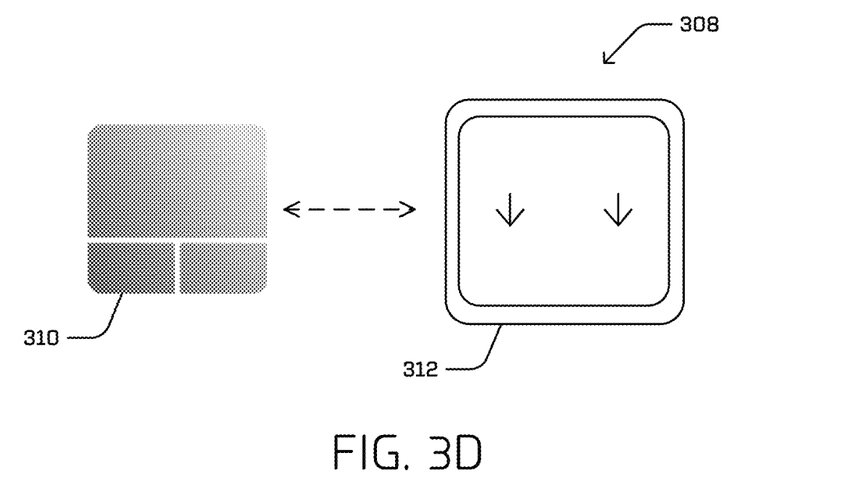
FIG. 3D depicts another example actuation interface in accordance with embodiments of the disclosure.

FIG. 3D depicts another actuation interface including a selectable control 308 having a touch pad 310 and a separate display screen 312. The touch pad 310 and the display screen 312 may be proximate to one another and configured to communicate actuation instructions displayed on the display screen 312 and inputs received at the touch pad 310 to control a cover to move, such as through wired and/or wireless communication. For example, the display screen 312 may display two arrows indicating two contact points with the touch pad 310 that are usable to actuate the cover to move in the direction of the two arrows. The display screen 312 may further display textual instructions, animations, video, and so forth showing the user how to engage with the touch pad 310. If detection of fewer than two contact points with the touch pad 310 are detected, the cover may be maintained in a same position.

The touch pad 310 may allow for contact points at any location within the area of the touch pad to actuate the cover to move. The touch pad 310 may be configured to enable a swipe gesture with the two contact points within the area of the touch pad to activate motion of the cover. Alternatively or additionally, the touch pad 310 may be contacted for a duration that corresponds to a distance of movement of the cover, and/or as a "binary" open/close function as described above. The two arrows shown in the display screen 312 may correspond to a required number of contact points at the touch pad 310 to actuate the cover to move, although any suitable number of contact points may be displayed (e.g., 3, 4, 5, etc.), and indicate a corresponding number of contact points that are required to actuate the cover to move. Additionally, a direction of the arrows shown in the display screen 312 may be up, down, left, right, and/or diagonally oriented, such as to represent a direction of movement of the cover.

Figure 3E:
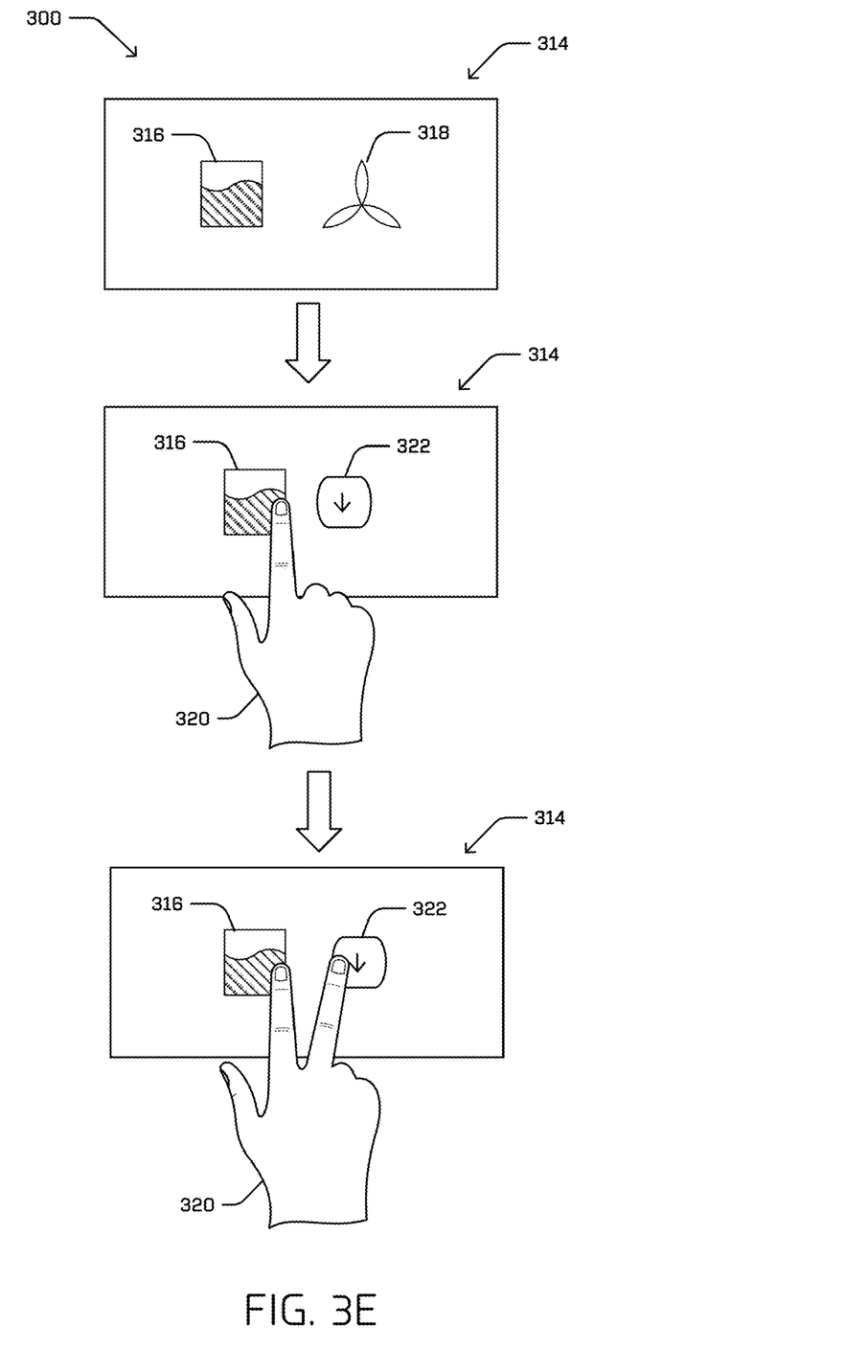
FIG. 3E depicts another example actuation interface in accordance with embodiments of the disclosure.

FIG. 3E depicts another actuation interface 314 including a selectable control 316 to control a shade of a vehicle, and a selectable control 318 to control a vent of the vehicle, which may be displayed in a touch interface. In response to a finger of a user's hand 320 contacting the selectable control 316 that controls the shade of the vehicle, the selectable control 320 for the vent is replaced (or supplemented with, overlaid by, etc.) in the touch interface with a selectable control 322 to actuate the shade to move. Until the selectable control 322 is selected, the cover (e.g., the shade in this example) may maintain a current position. However, the user may select the selectable control 322 with an additional finger of the user's hand 320 (or the user's other hand), while maintaining contact with the selectable control 316 for the shade, thus causing the cover to move in a direction indicated by the arrow of the selectable control 322.

The touch screen displaying the actuation interface 314 may be configured to enable a swipe gesture with the two contact points of the fingers of the user's hand 320 to activate motion of the cover. Alternatively or additionally, the touch screen displaying the actuation interface 314 may be contacted for a duration that corresponds to a distance of movement of the cover, and/or as a "binary" open/close function as described above. The additional selectable control 322 used to control the actuation of the cover may correspond to a required number of additional concurrent contact points (e.g., in addition to the contact point with the selectable control 316), although any suitable number of additional selectable controls may be displayed representing additional contact points necessary for actuation (e.g., 2, 3, 4, etc.). additionally, a direction of the arrows shown in the actuation interface 314 may be up, down, left, right, and/or diagonally oriented, such as to represent an available direction of movement of the cover.

While arrows are shown in the examples of FIGS. 3A-3E, in other examples other directional indicators (e.g., triangles, carrots, moving animations, etc.) may additionally or alternatively be used. In some cases, in addition to or instead of the arrows or other directional indicators, an instruction such as the descriptor 108 may be displayed to guide a user how to actuate the cover to move using the touch pad 310 or the actuation interface 314. In one example, the display screen 312 may provide a first instruction to execute a multi-touch swipe gesture on the touch pad 310 to open or close a first cover (e.g., a window), and a second instruction on the display screen 312 to execute a multi-touch input on the touch pad (e.g., a "binary" input) to open or close a second cover (e.g., a door).

Additionally, in some examples different touch inputs may be required for opening and closing a cover, such as by the actuation interfaces shown in FIGS. 3A-3E. For instance, an actuation interface may be used open a cover responsive to a single touch input, but may require two or more touch inputs to close the cover.

Figure 4:
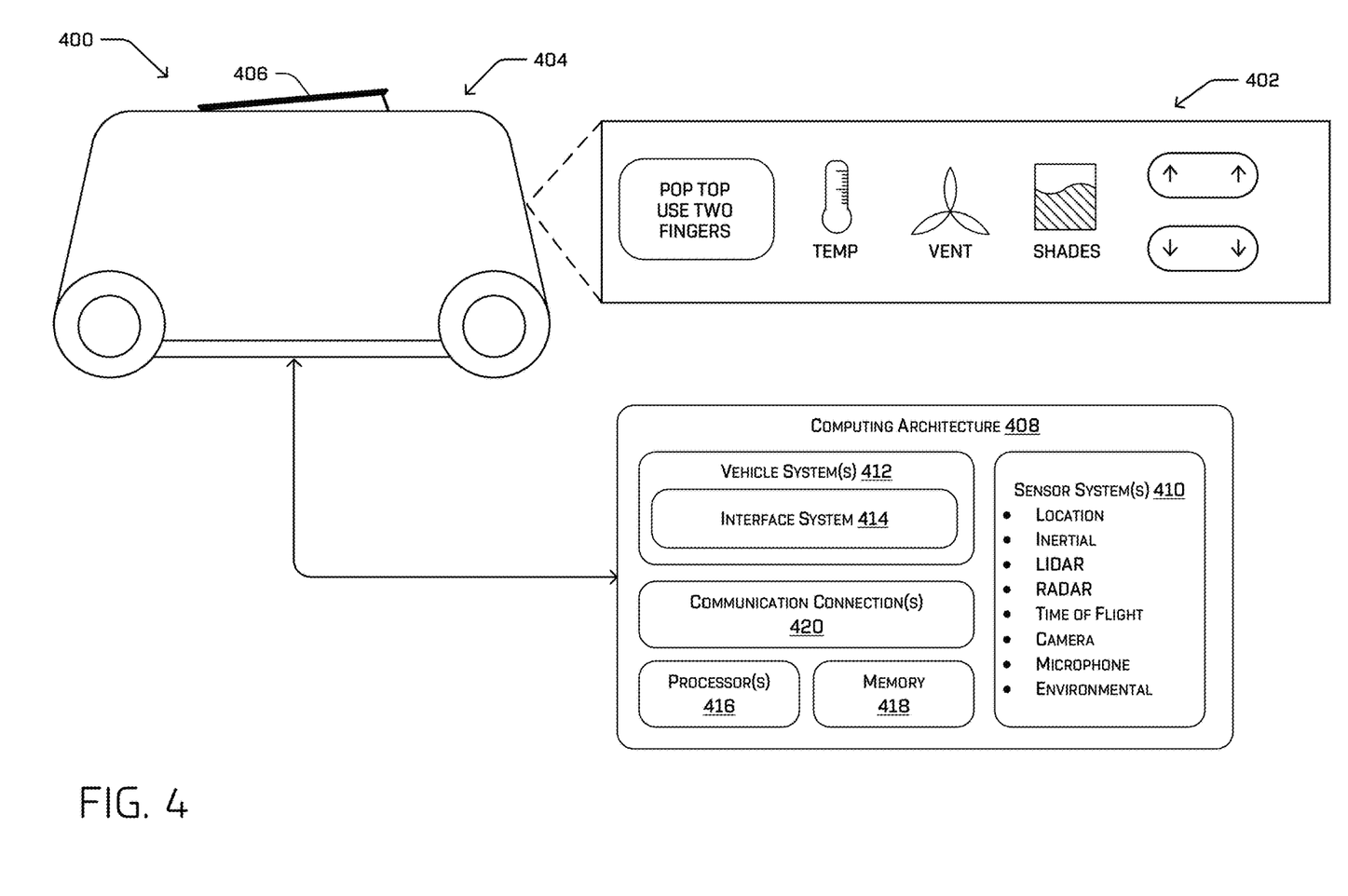
FIG. 4 is a side view of an example system including a vehicle having an actuation interface, in accordance with embodiments of the disclosure.

FIG. 4 is a side view of an example system 400 including an actuation interface 402, in accordance with embodiments of the disclosure. The actuation interface 402 may be configured to actuate one or more components of a vehicle 404, such as a roof cover 406 as pictured. However, the actuation interface 402 may be employed by any suitable system to actuate movement of a cover, or activation of another vehicle system, as described above. FIG. 4 also illustrates an example computing architecture 408 of a computing device of the vehicle 404.

The computing architecture 408 of the vehicle computing device in this example includes one or more sensor systems 410. In some examples, the sensor system(s) 410 include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.) time of flight sensors, microphones, wheel encoders, environment sensors (e.g., temperature sensors, humidity sensors, light sensors, pressure sensors, wind speed sensors, etc.), etc. The sensor system(s) 410 can include multiple instances of each of these or other types of sensors. For instance, the lidar sensors can include individual lidar sensors located at the corners, front, back, sides, and/or top of the vehicle 404. As another example, the camera sensors can include multiple cameras disposed at various locations about the exterior and/or interior of the vehicle 404.

The sensor system(s) 410 provide input directly to one or more vehicle systems 412. In some examples, the vehicle system(s) 412 may include a vehicle control system to control steering, propulsion, braking, and/or communication systems of the vehicle 404. As shown, the vehicle system(s) 412 include an interface system 414 for the actuation interface 402 to display the actuation interface and control actuation of the cover 406 based on user inputs received by the actuation interface. The interface system 414 may be configured to output instructions in the actuation interface 402, such as which portion of the vehicle is currently being controlled by the actuation interface (e.g., "Pop Top" as shown), along with how to operate the portion of the vehicle currently being controlled by the actuation interface (e.g., "Use Two Fingers" as shown). The interface system 414 may include a touch screen for displaying the actuation interface 412 and receiving touch inputs, where the touch screen includes an input device layered with an electronic visual display of an information processing system. In some cases, the interface system 414 may include a touch pad that includes a tactile sensor that translates motion and/or position of a user's digits to a relative position on an operating system that is made output to a separate display screen. Even further, the interface system 414 may include physical or soft buttons, used either with or without a display screen, to control actuation of the cover 406.

Additionally, in some examples, such as when the vehicle 404 is an autonomous vehicle, the vehicle systems 412 may also include a localizer system to estimate a change in position of the vehicle 404 over time, a perception system to perform object detection and/or classification, and/or a planner system to determine routs and/or trajectories to use to control the vehicle.

The computing architecture 408 also includes one or more processors 416 and memory 418 communicatively coupled with the one or more processors 416. The processor(s) 416 may be any suitable processor capable of executing instructions to implement the vehicle system(s) 412. By way of example and not limitation, the processor(s) 416 may comprise one or more Central Processing Units (CPUs), Graphics Processing Units (GPUs), Electronic Control Units (ECUs), vehicle controllers, or any other device or portion of a device that processes electronic data from registers and/or memory to transform that electronic data into other electronic data that may be stored in registers and/or memory.

Memory 418 is an example of non-transitory computer-readable media. Memory 418 may store an operating system and one or more software applications, instructions, programs, and/or data to implement the methods described herein and the functions attributed to the various systems. In various implementations, the memory 418 may be implemented using any suitable memory technology, such as static random access memory (SRAM), synchronous dynamic RAM (SDRAM), nonvolatile/Flash-type memory, or any other type of memory capable of storing information.

The computing architecture 408 also includes one or more communication connections 420 that enable communication by the vehicle with one or more other local or remote computing devices. The communications connection(s) 420 include physical and/or logical interfaces for connecting the computing architecture 408 to another computing device or a network. For example, the communications connection(s) 420 may enable cellular communication, WiFi-based communication such as via frequencies defined by the IEEE 802.11 standards, short range wireless frequencies such as Bluetooth®, or any suitable wired or wireless communications protocol that enables the respective computing device to interface with the other computing devices.

The architectures, systems, and individual elements described herein may include many other logical, programmatic, and physical components, of which those shown in the accompanying figures are merely examples that are related to the discussion herein.

Example Process of Operating an Actuation Interface

Figure 5:
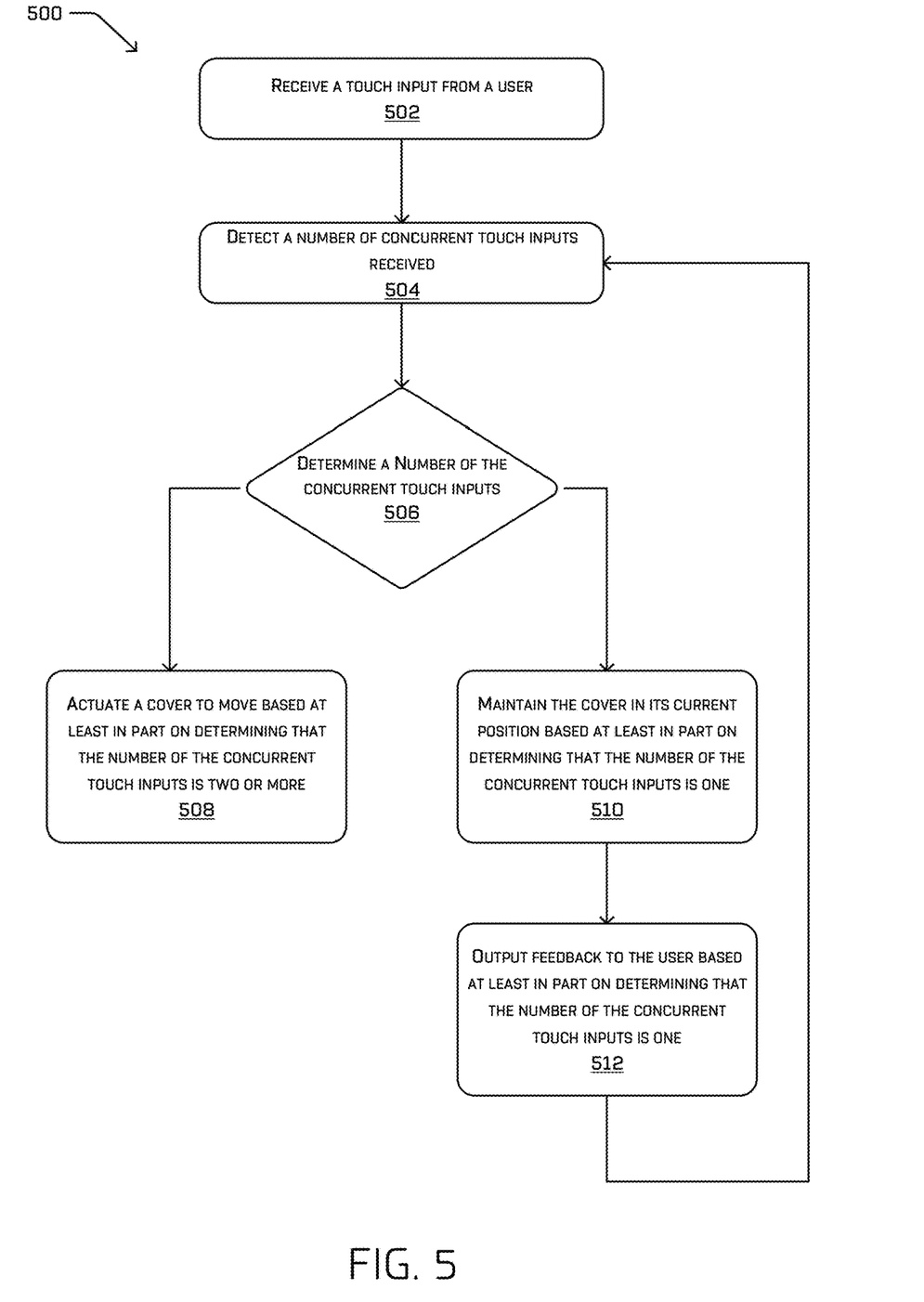
FIG. 5 is a flowchart illustrating an example method of operating an actuation interface, in accordance with embodiments of the disclosure.

FIG. 5 is a flowchart illustrating an example method 500 of operating an actuation interface, in accordance with embodiments of the disclosure. The method 500 is described with reference to the actuation interface system of FIG. 1 for convenience and ease of understanding. However, the method 500 is not limited to being performed using the actuation interface system of FIG. 1 and may be implemented using any of the other actuation interface systems described in this application, as well as actuation interface systems other than those described herein. Moreover, the actuation interface systems described herein are not limited to performing the method 500.

At operation 502, a touch input is received from a user, such as at the actuation interface 104. In one example, the actuation interface 104 may be displayed in a touch interface configured to detect touch inputs at various locations of the actuation interface and execute instructions accordingly. In another example, the actuation interface 104 may be buttons which may be pressed by touch inputs to actuate movement of a cover, for instance. In yet another example, the actuation interface 104 may be a touch pad configured to detect touch inputs and execute instructions accordingly, such as based on a display screen displaying instructions for operating a cover by touch inputs on the touch pad. The touch input may be a digit input (e.g., finger or thumb), a stylus input, a hand input, and so forth.

At operation 504, a number of concurrent touch inputs received are detected. For example, where the actuation interface 104 is a touch interface or a touch pad, the number of concurrent touch inputs may be detected using resistive panels, surface acoustic wave panels, capacitive panels, an infrared grid, optical imaging, acoustic pulse recognition, and so forth. In some cases, the actuation interface 104 may comprise one or more buttons, which may detect concurrent touch inputs when the push buttons are in a pushed state.

At operation 506, a number of the concurrent touch inputs are determined. At operation 508, a cover is actuated to move based at least in part on determining that the number of the concurrent touch inputs is two or more. In some cases, the cover 106 may be controlled to open in a "binary" fashion, where the cover opens and/or closes fully in response to detection of a required number of concurrent inputs in the actuation interface 104. In another example, the cover 106 may be controlled to open based on a duration of the concurrent touch inputs, and/or based on a distance of a swipe gesture performed by the concurrent touch inputs. While operation 508 describes the cover being actuated to move based on determining that the number of the concurrent touch inputs is two or more, any suitable number of concurrent touch inputs may be used to control actuation of the cover as described above (e.g., 3, 4, 5, etc.). Additionally, the vehicle 102 may be a bi-directional vehicle, where the cover 106 is configured to selectively open in a direction generally facing away from the direction of travel 118 (e.g., with a trailing edge 120 of the cover raised). In this example, actuating the cover 106 to move to the open position may include selecting one of multiple open positions based on a direction of travel of the bi-directional vehicle upon detecting two or more concurrent touch inputs at the actuation interface 104. In some examples, the vehicle computing device may determine a current direction of travel of the vehicle based on an output from a planner, controller, or other system of the vehicle.

At operation 510, the cover is maintained in its current position based at least in part on determining that the number of the concurrent touch inputs is one (i.e., a single concurrent touch input). By maintaining the cover in its current position when only one touch input is received, the actuation interface 104 minimizes a likelihood of accidental actuation of actuation devices in the occupant compartments of vehicles used to close power-operated windows, partitions, and roof panels. In some examples, the techniques described herein may be used when the power-operated windows, partitions, or roof panel do not have an anti-pinch features built in. By employing multiple contact points to actuate a power-operated window, partition, roof panel, or other cover, an inadvertent single point of contact touch, such as by a digit or object (e.g., a box, bag, strap, umbrella, etc.) will not cause the cover to move. However, the techniques described herein can also be used to control power-operated windows, partitions, roof panels, and/or other covers that do have anti-pinch features installed, thereby providing an additional measure of safety.

At operation 512, feedback is outputted to the user based at least in part on determining that the number of the concurrent touch inputs is one. The feedback may be visual feedback, such as highlighting a selectable indicator in the actuation interface 104, a video or animation, or activating other lights inside or outside of the vehicle, to name a few examples. Alternatively or additionally, the feedback may be haptic feedback, such as a vibration at the actuation interface 104, in a seat of the vehicle, and so forth. Alternatively or additionally, the feedback may be auditory feedback, such as an alert sound, an instruction to provide an additional touch input, and so on. While the operations 510 and 512 are described as occurring in response to determining that the number of touch inputs is one, in some cases the operations 510 and/or 512 may occur in response to the number of touch inputs being more than one (e.g., 2, 3, 4, etc.), but less than a number of touch inputs required to actuate the cover to move. The operations may return to operation 504, where a number of concurrent touch inputs are received, such as a changed number of concurrent touch inputs at the actuation interface 104 in response to the feedback.

The method 500 is illustrated as a collection of blocks in a logical flow graph, which represents sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process may be omitted entirely. Moreover, the method 500 may be combined in whole or in part with other methods.

The various techniques described herein may be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example Clauses

A: A vehicle comprising: a cover movably coupled to a body of the vehicle configured to move between a closed position in which the cover covers an opening in a compartment of the vehicle and an open position in which the cover partially covers the opening; one or more processors and memory, the memory storing instructions that, when executed by the one or more processors, configure the vehicle to perform operations comprising: receiving, at a touch interface, touch input from a user; detecting a number of concurrent touch inputs that are received at the touch interface; determining whether to actuate the cover to move based at least in part on the number of the concurrent touch inputs that are received at the touch interface; and controlling actuation of the cover based at least in part on the determination of the number of concurrent touch inputs.

B. The vehicle of paragraph A, wherein the touch interface comprises a touch screen that displays one or more selectable controls.

C: The vehicle of either paragraph A or B, wherein the number of concurrent touch inputs is two or more, and the controlling the actuation of the cover comprises actuating the cover to move from the open position to the closed position or from the closed position to the open position.

D: The vehicle of any ones of paragraphs A-C, wherein: the open position is one of multiple open positions, and the actuating the cover to move to the open position further includes selecting one of the multiple open positions based at least in part on a direction of travel of the vehicle.

E: The vehicle of any one of paragraphs A-D, wherein the number concurrent touch inputs is one, and the controlling the actuating of the cover comprises maintaining the cover in its current position.

F: The vehicle of any ones of paragraphs A-E, wherein the operations further comprise outputting feedback based on the detecting that the number concurrent touch inputs is one, the feedback comprising at least one of: visual feedback; haptic feedback; or audible feedback.

G: The vehicle of any ones of paragraphs A-F, wherein: the touch interface comprises a touch screen with multiple selectable controls for actuation in substantially a same direction, and the operations further comprise outputting visual feedback indicating an unselected one of the selectable controls.

H: The vehicle of any one of paragraphs A-G, wherein the touch input comprises a multi-touch swipe gesture.

I: The vehicle of any one of paragraphs A-H, wherein a distance the cover is actuated to move is based on a duration of the concurrent touch inputs or a distance of a multi-touch swipe gesture by the concurrent touch inputs.

J: The vehicle of any one of paragraphs A-I, wherein the opening is disposed in a top of the compartment.

K: A method comprising: receiving, via a touch interface, touch input; detecting a number of concurrent touch inputs that are received; determining whether to actuate a cover to move based at least in part on the number of the concurrent touch inputs that are received; and controlling actuation of the cover based at least in part on the determination of the number of concurrent touch inputs.

L: The method of paragraph K, wherein the touch input is received at a touch screen that displays one or more selectable controls.

M: The method of either paragraph K or L, wherein the number of concurrent touch inputs is two or more, and the controlling the actuation of the cover comprises actuating the cover to move from an open position to a closed position or from the closed position to the open position.

N: The method of any one of paragraphs K-M, wherein: the cover covers an opening in a compartment of a vehicle, the open position is one of multiple open positions, and actuating the cover to move to the open position further includes selecting one of the multiple open positions based at least in part on a direction of travel of the vehicle.

O: The method of any one of paragraphs K-N, wherein the cover comprises one of a sunroof, a shade, a window, or a door.

P: One or more non-transitory computer-readable media storing instructions that, when executed, cause one or more processors to perform operations comprising: receiving a touch input; detecting a number of concurrent touch inputs that are received; determining whether to actuate an object to move based at least in part on the number of the concurrent touch inputs that are received, the object being different than the touch interface; and controlling actuation of the object based at least in part on the determination of the number of concurrent touch inputs.

Q: The one or more non-transitory computer-readable media of paragraph P, wherein the number concurrent touch inputs is one, and the controlling the actuating of the object comprises maintaining the object in its current position.

R: The one or more non-transitory computer-readable media of paragraph P or Q, wherein the operations further comprise outputting feedback based on the detecting that the number concurrent touch inputs is one, the feedback comprising at least one of: visual feedback; haptic feedback; or audible feedback.

S: The one or more non-transitory computer-readable media of any one of paragraphs P-R, wherein: the touch input is received by a touch screen with multiple selectable controls for actuation in substantially a same direction, and the operations further comprise outputting visual feedback indicating an unselected one of the selectable controls.

T: The one or more non-transitory computer-readable media of any one of paragraphs P-S, wherein a distance the object is actuated to move is based on a duration or a distance of a swipe of the touch input.

While the example clauses described above are described with respect to one particular implementation, it should be understood that, in the context of this document, the content of the example clauses can also be implemented via a method, device, system, a computer-readable medium, and/or another implementation.

CONCLUSION

Although the discussion above sets forth example implementations of the described techniques, other architectures may be used to implement the described functionality, and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A vehicle comprising:
a cover movably coupled to a body of the vehicle configured to move between a closed position in which the cover covers an opening in a compartment of the vehicle and an open position in which the cover partially covers the opening;
one or more processors and memory, the memory storing instructions that, when executed by the one or more processors, configure the vehicle to perform operations comprising:
displaying, at a touch interface, two or more selectable controls associated with actuating the opening, wherein a selectable control of the two or more selectable controls comprises at least a first indicator displayed within the selectable control and a second indicator displayed within the selectable control;
receiving, at the touch interface, touch input from a user;
detecting, via at least the first indicator of the selectable control displayed on the touch interface, a number of concurrent touch inputs that are received at the touch interface;
determining whether to actuate the cover to move based at least in part on the number of the concurrent touch inputs that are received via the touch interface, wherein:
responsive to detecting that the number of concurrent touch inputs received via the selectable control is one, causing:
feedback to be displayed on the touch interface indicating that the touch input requires an additional touch input to select the selectable control, the feedback comprising highlighting at least the second indicator; and
the cover to remain at a current position; and
responsive to detecting that the number of concurrent touch inputs received via the selectable control is more than one;
causing the selectable control to be selected; and
actuating the cover to move based at least in part on a duration or a distance associated with the touch input.

2. The vehicle of claim 1, wherein actuating the cover comprises actuating the cover to move from the open position to the closed position or from the closed position to the open position.

3. The vehicle of claim 2, wherein:
the open position is one of multiple open positions, and
actuating the cover to move to the open position further includes selecting one of the multiple open positions based at least in part on a direction of travel of the vehicle.

4. The vehicle of claim 1, the feedback further comprising one or more of
haptic feedback or
audible feedback.

5. The vehicle of claim 1, wherein the touch input comprises a multi-touch swipe gesture.

6. The vehicle of claim 1, wherein a distance the cover is actuated to move is based on the distance associated with the touch input.

7. The vehicle of claim 1, wherein the opening is disposed in a top of the compartment.

8. The vehicle of claim 1, the operations further comprising determining a direction of travel of the vehicle, and wherein actuating the cover comprises controlling a direction the cover is actuated to move based at least in part on the direction of travel of the vehicle.

9. The vehicle of claim 1, wherein the cover comprises one of a sunroof, a shade, a window, or a door.

10. A method comprising:
displaying, at a touch interface, two or more selectable controls associated with actuating a cover, wherein a selectable control of the two or more selectable controls comprises at least a first indicator displayed within the selectable control and a second indicator displayed within the selectable control;
receiving, via the touch interface, touch input;
detecting, via at least the first indicator of the selectable control displayed on the touch interface, a number of concurrent touch inputs that are received via the touch interface;
determining whether to actuate the cover to move based at least in part on the number of the concurrent touch inputs that are received, wherein:
responsive to detecting that the number of concurrent touch inputs received via the selectable control is one, causing:
feedback to be displayed on the touch interface indicating that the touch input requires an additional touch input to select the selectable control, the feedback comprising highlighting at least the second indicator; and
the cover to remain at a current position; and
responsive to detecting that the number of concurrent touch inputs received via the selectable control is more than one;
causing the selectable control to be selected; and
actuating the cover to move based at least in part on a duration or a distance associated with the touch input.

11. The method of claim 10, wherein actuating the cover comprises actuating the cover to move from an open position to a closed position or from the closed position to the open position.

12. The method of claim 11, wherein:
the cover covers an opening in a compartment of a vehicle,
the open position is one of multiple open positions, and
actuating the cover to move to the open position further includes selecting one of the multiple open positions based at least in part on a direction of travel of the vehicle.

13. The method of claim 10, the cover comprises one of a sunroof, a shade, a window, or a door.

14. The method of claim 10, wherein the touch input comprises one or more inputs made by a hand, a digit, or a stylus.

15. The method of claim 10, wherein a number of indicators displayed within the selectable control corresponds to a number of concurrent touch inputs required to actuate the cover to move.

16. One or more non-transitory computer-readable media storing instructions that, when executed, cause one or more processors to perform operations comprising:
displaying, at a touch interface, two or more selectable controls associated with actuating a cover, wherein a selectable control of the two or more selectable controls comprises at least a first indicator displayed within the selectable control and a second indicator displayed within the selectable control;

receiving, at the touch interface, a touch input;
detecting, via at least the first indicator of the selectable control displayed on the touch interface, a number of concurrent touch inputs that are received via the touch interface;
determining whether to actuate the cover to move based at least in part on the number of the concurrent touch inputs that are received via the touch interface, wherein:
  responsive to detecting that the number of concurrent touch inputs received via the selectable control is one, causing:
    feedback to be displayed on the touch interface indicating that the touch input requires an additional touch input to select the selectable control, the feedback comprising highlighting at least the second indicator; and
    the cover to remain at a current position; and
  responsive to detecting that the number of concurrent touch inputs received via the selectable control is more than one;
    causing the selectable control to be selected; and
    actuating the cover to move based at least in part on a duration or a distance associated with the touch input.

17. The one or more non-transitory computer-readable media of claim 16, the feedback further comprising
  haptic feedback or
  audible feedback.

18. The one or more non-transitory computer-readable media of claim 16, wherein:
  the touch input is received by the first indicator and the second indicator for actuation in substantially a same direction.

19. The one or more non-transitory computer-readable media of claim 16, wherein a distance the object is actuated to move is based on the distance of a swipe of the touch input.

20. The one or more non-transitory computer-readable media of claim 16, wherein the cover is one of a sunroof, a shade, a window, or a door.

* * * * *